US005708670A

United States Patent [19]
Pfeiffer

[11] Patent Number: 5,708,670
[45] Date of Patent: Jan. 13, 1998

[54] MODE-LOCKED FIBER LASER HAVING AN OPTICAL PATH LENGTH CONTROLLER FOR A FIBER RESONATOR

[75] Inventor: Thomas Pfeiffer, Stuttgart, Germany

[73] Assignee: Alcatel N.V., Rijswijk, Netherlands

[21] Appl. No.: 558,834

[22] Filed: Nov. 15, 1995

[30] Foreign Application Priority Data

Nov. 21, 1994 [DE] Germany .................. 44 41 133.2

[51] Int. Cl.⁶ .................................................. H01S 3/098
[52] U.S. Cl. ........................ 372/18; 372/6; 372/25
[58] Field of Search ............................ 372/6, 9, 18, 25, 372/26, 28, 29, 32, 33, 92

[56] References Cited

U.S. PATENT DOCUMENTS

| 5,305,336 | 4/1994 | Adar et al. ............ | 372/18 |
| 5,359,612 | 10/1994 | Dennis et al. ........... | 372/18 |
| 5,367,529 | 11/1994 | Holsinger et al. ........ | 372/25 X |
| 5,546,414 | 8/1996 | Pfeiffer ............... | 372/18 |

FOREIGN PATENT DOCUMENTS 0632552  1/1995  European Pat. Off. .

OTHER PUBLICATIONS

"Stabilizing Er fiber soliton laser with pulse phase locking" in the Jan. 1992 issue of Electronic Letters, pp. 182–184, vol. 28, No. 2, Shan et al.

"Dual Wavelength Pulse Generation Using Mode-Locked Erbium-Doped Fiber Ring Laser" Electronics Letters, 24 Oct. 1991, vol. 27, No. 22, 2 pp, Schlager et al.

Primary Examiner—John D. Lee
Attorney, Agent, or Firm—Ware, Fressola, Van Der Sluys & Adolphson LLP

[57] ABSTRACT

The pulse repetition frequency of an optical pulse generator built with a fiber laser (LAS) is synchronized to a fixed clock frequency (fc). The synchronization is accomplished via means (M) for changing the optical path length of the resonator (RES), which is controlled by a signal from a control device (RE). The criterion for the synchronization is the effective value of an interference signal superimposed on the signal light, which increases with increasing deviation of the pulse repetition frequency from the clock frequency. A portion of the output signal (A) of fiber laser (LAS) is optically/electrically converted by the control device (RE), and the effective value of the interference signal is determined by filtering and rectifying the electrical signal obtained in this manner. After subsequent amplification and regulation, the control signal for the means (M) to change the optical wavelength is obtained. The control signal is additionally modulated with a wobble signal, so that the pulse repetition frequency always varies around the optimum value and is synchronized in this way.

5 Claims, 2 Drawing Sheets

MODE-LOCKED FIBER LASER HAVING AN OPTICAL PATH LENGTH CONTROLLER FOR A FIBER RESONATOR

TECHNICAL FIELD

The invention concerns a mode-locked fiber laser for generating pulsed signal light.

BACKGROUND OF THE INVENTION

The article "Stabilizing Er fiber soliton laser with pulse phase locking" in the January 1992 issue of Electronic Letters, pages 182–184, describes a synchronization method for an active mode-locked fiber laser. The fiber laser, which operates as a ring laser, is configured with a means for changing the optical path length of the ring resonator. The synchronization of the fiber laser with an external clock frequency takes place through a control signal for the means for changing the optical path length. The control signal is determined by a control device with a PLL (phased locked loop) from a portion of the fiber laser's output signal. The phase comparison in the PLL between the pulse repetition frequency and the external clock frequency takes place in the GHz range, which requires the use of expensive high-frequency electronics.

SUMMARY OF THE INVENTION

It is therefore the task of the invention to make available a technically simpler synchronization method for a mode-locked fiber laser.

This task is fulfilled by a mode-locked fiber laser for generating pulsed signal light of a predetermined pulse repetition frequency, comprising a fiber resonator, a means for changing the optical path length of the fiber resonator, and a control device which is connected to the fiber resonator and to the means for changing the optical path length and in which a control signal for the means for changing the optical path length is generative from a portion of the output of the fiber laser, characterized in that in the control device, an interfering signal superimposed on the signal light is determinable whose frequency is lower than the pulse repetition frequency, and that the control signal is derivable from the interfering signal. A special advantage of the invention resides in the flexible application of the synchronization method to fiber lasers with different pulse repetition frequencies, since the synchronization method is independent of the selected pulse repetition frequency.

BRIEF DESCRIPTION OF THE DRAWINGS

The invention will be explained in the following by means of a configuration example with the aid of FIGS. 1 to 4, where.

BEST MODE FOR CARRYING OUT THE INVENTION

A configuration example of the invention will now be described by means of FIGS. 1 to 4.

Figure 1:
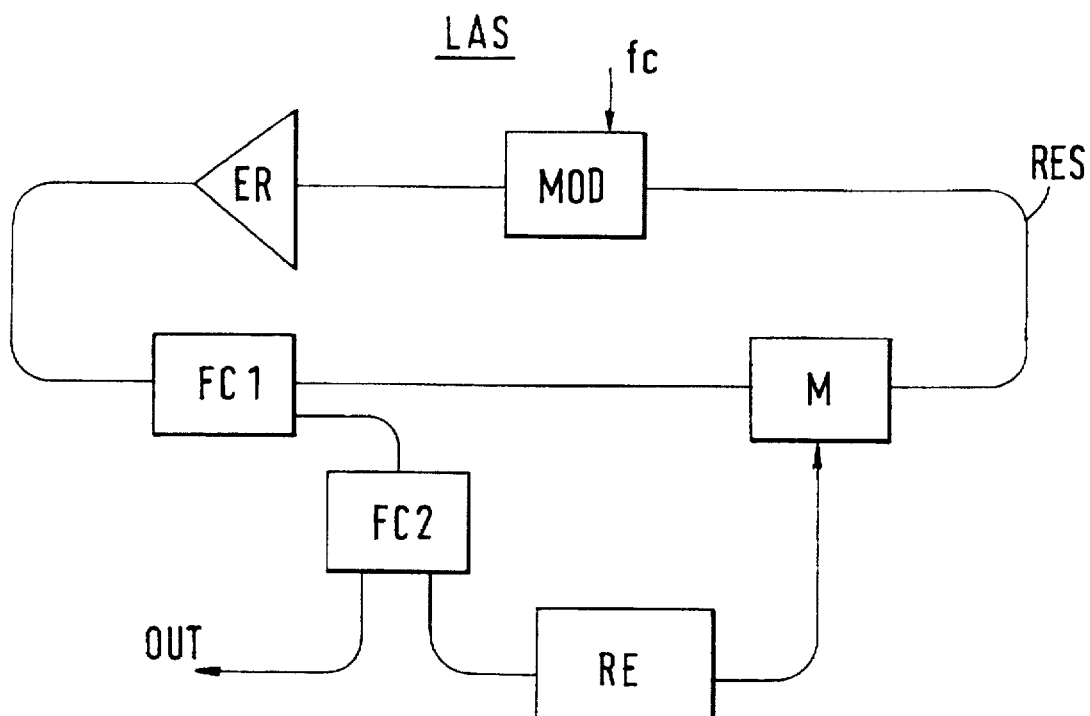
FIG. 1 is a schematic diagram of a configuration example of the mode-locked fiber laser of the invention.

FIG. 1 depicts a fiber laser constructed as an active mode-locked fiber ring laser LAS, which can operate synchronously with an external clock pulse. To that end, the fiber ring laser LAS has a modulator MOD in the form of a Mach-Zehnder (heterodyne) interferometer for coupling an external clock signal with the frequency $f_c$ to a ring resonator RES. In addition, an optical amplifier ER with a not illustrated pumping laser, a decoupling device FC1 for decoupling an output signal A, and a means M for changing the optical path length L of the ring resonator RES, are connected to the ring resonator RES, which is constructed as a fiber resonator. Another coupling device FC2 is connected to the decoupling device FC1, whereby a portion of output signal A is routed to a control device RE for controlling the means M. A fiber amplifier, e.g. an erbium-doped fiber amplifier, is used as the optical amplifier ER. The coupling devices FC1 and FC2 are advantageously constructed as fiber couplers, allowing the decoupling device FC1 to decouple e.g. 20% of the light from the ring resonator, and couple e.g. 10% of the light to the control device RE via the coupling device FC2, and 90% is routed to the output OUT of the fiber ring laser LAS.

A unit with an electro-optically active medium, whose index of refraction changes when an electrical field is applied, is particularly suited as the means M for changing the optical path length L of the ring resonator RES. Such units are known e.g. as electro-optical phase modulators. A heating and/or cooling device can also be used as the means M for changing the optical path length L, which is thermally coupled to the ring resonator RES or even only to a portion of the fiber resonator, and can be controlled by the control device RE. An optical fiber spool, which is especially wound around a heating or cooling core, and is a component of the fiber resonator RES, proves to be particularly advantageous in this regard. Changing the temperature of the ring resonator RES, or a part thereof, achieves a change in the length of the ring resonator RES.

To change the optical path length L of ring resonator RES, the fiber may also be interrupted and have an air gap, which can also be achieved without reflections, e.g. by using so-called GRIN lenses placed at both ends of the fiber. One of the two fiber ends is then attached to a mechanically moveable actuator, e.g. a piezoelectric actuator, and the air gap between the two fiber ends is changed by the movement of the actuator. A change in the air gap then causes a change in the resonator length. Another possibility of changing the optical path length L lies in the mechanical expansion of the fiber, or a part thereof, which causes both a direct mechanical change in the fiber length as well as changes in the optical properties.

When the fiber ring laser 1 is used in a message transfer system, a tuning range of more than 1 nm is required in the means M for changing the optical path length of ring resonator RES.

After the pumping laser of the active mode-locked fiber ring laser LAS is switched on, the noise in the ring resonator RES forms a signal light through stimulated emissions in the optical amplifier ER. Controlling the modulator by means of the external clock frequency $f_c$ forms a pulsed signal light with the pulse repetition frequency $f_p$ in the ring resonator RES, which corresponds to the external clock frequency $f_c$. With optimum synchronization, the pulse repetition frequency $f_p$ being formed is an integral multiple of the circulation frequency $f_u$ of the light in the ring resonator RES. The circulation frequency $f_u$ is determined by $f_u = c/(R \times n)$, where c=the speed of light in a vacuum, R=resonator length and n=the index of refraction. For example, a circulation frequency of f=6.67 MHz is the result when L=30 m and n=1.5. Now, if a change in the resonator length takes place, e.g. due to manufacturing tolerances or due to temperature changes, the result is a difference in the synchronization between the circulation frequency $f_u$ and the external clock frequency $f_c$. The circulation frequency $f_u$ is synchronized with the external clock frequency $f_c$ via the control device RE and the means M for changing the optical path length L.

Figure 2:
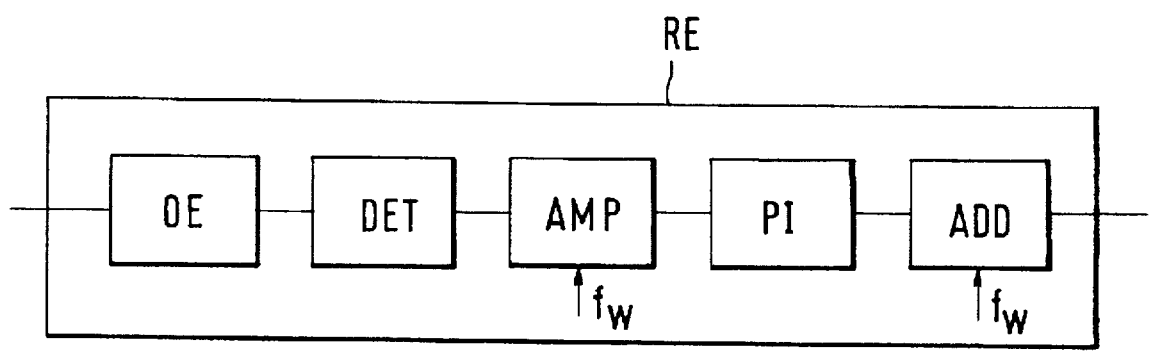
FIG. 2 is a schematically depicted construction of a control device of the mode-locked fiber laser of the invention.

FIG. 2 only reflects the schematically represented construction of the control device in FIG. 1. The control device RE contains an optical/electrical converter OE, a detection installation DET, a phase-sensitive amplifier AMP and a controller PI.

The optical/electrical converter OE e.g. contains a photodiode. A portion of the light coupled out of the optical output signal A is optically/electrically converted in the optical/electrical converter OE. In addition to the signal light, the output signal A of the fiber ring laser LAS also contains an interference signal. The interference signal is caused by undesirable oscillations, which occur in fiber lasers, e.g. because of fluctuations in the pumping wavelength or in the pump power of the pumping laser, or because of fluctuations in the ring losses in ring resonator RES due to external thermal or mechanical influences. The amplitude of the interference signal changes with the degree of synchronization of circulation frequency $f_u$ with the external clock frequency $f_c$. With optimum synchronization, the amplitude of the interference signal is minimal. With an increasing deviation of the synchronization of the circulation frequency $f_u$ with the clock frequency $f_c$ (positive or negative), the amplitude of the interference signal also increases. The amplitude of the interference signal can therefore be used as a measure of the deviation of the synchronization of circulation frequency $f_u$ with the external clock frequency $f_c$, and thereby as a criterion of the synchronization. At <100 KHz, the frequency of the interference signal is clearly under that of the pulse repetition frequency $f_p$ and the external clock frequency $f_c$, which lie in the order of magnitude of 1 MHz to 100 GHz. The photodiode for the optical/electrical converter OE can therefore be a "slow" photodiode that only detects signals with a frequency of e.g. <150 KHz.

The output signal of the optical/electrical converter OE contains the electrically converted signal light and the electrically converted interference signal. This output signal is conducted to the detection installation DET.

The detection installation DET filters out the interference signal from the electrical signal obtained by the optical/electrical converter OE, and the effective value of the interference signal's amplitude is determined. Further details in this regard are described for FIG. 3.

The output signal of detection installation DET is routed to amplifier AMP, which is constructed as a phase-sensitive Lock-In-Amplifier, where it is phase-sensitively rectified. In the downstream control PI, a so-called PI (D) control, the rectified signal is ideally adjusted for its minimum value. The output signal of control PI is routed through an adder ADD to the means M for changing the optical path length L of ring resonator RES. In order to be able to utilize the Lock-In-Method, the control signal gained from control PI is superimposed in the adder ADD with a wobble signal with a frequency $f_w$, e.g. with $f_w$=100 Hz, and the electrical signal in the Lock-In-Amplifier is phase-sensitively rectified at $f_w$=100 Hz. The wobbling, which is a method known to the professional, whereby a system to be controlled is only slightly disturbed, in this case with the frequency $f_w$=100 Hz, causes the control circuit to always oscillate around the optimum operating point, which leads to a periodic interference. Due to the periodic interference, the direction of a possibly present deviation of the synchronization between the circulation frequency $f_u$ and the external clock frequency $f_c$ can easily be determined. The control signal can additionally be superimposed with an adjustable direct voltage in the adder ADD, in order to roughly preadjust the operating point of the means M for changing the optical path length L.

Figure 3:
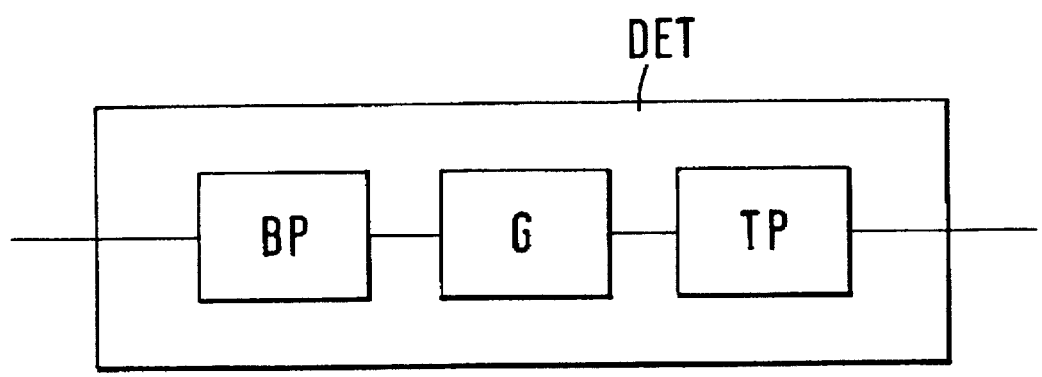
FIG. 3 is a schematic diagram of a detector in the control device of FIG. 2.

Now, FIG. 3 shows a schematic representation of the detection installation in FIG. 2. The detection installation DET contains a band-pass filter BP, a rectifier G and a low-pass filter TP. The band-pass filter filters the interference signal out of the electrical signal gained by the optical/electrical converter OE. The band-pass range of the band-pass later BP extends e.g. from 10 KHz to 100 KHz. The interference signal is routed to the phase-sensitive rectifier G where it is rectified, and then to the low-pass filter TP, where it is smoothed out to determine the effective value of the amplitude. The cut-off frequency of the low-pass filter TP is e.g. <100 Hz.

Figure 4:
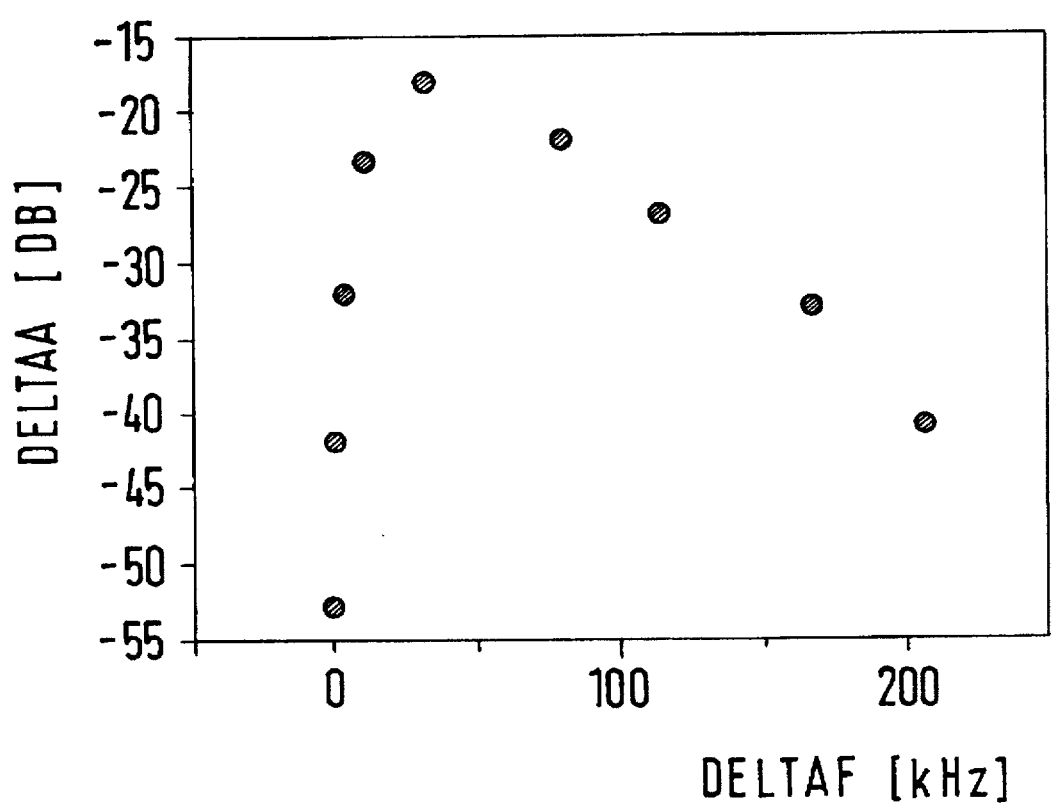
FIG. 4 is a diagram that depicts the dependence of the interference signal on the difference of the synchronization between the circulation frequency and the external clock frequency.

Now, FIG. 4 shows a diagram which depicts the dependence of the interference signal on the deviation of the synchronization between the circulation frequency $f_u$ and the external clock frequency $f_c$. The vertical represents the relative amplitude change DELTAA of the interference signal with respect to a reference amplitude in decibels (DB). The horizontal represents the absolute value of the deviation DELTAF of the synchronization between the circulation frequency $f_u$ and the external clock frequency $f_c$ in Kilo-Hertz (KHZ). The relative amplitude change DELTAA is for deviations that are smaller than plus/minus 40 KHz, a monotonically rising function with a steep incline. In this way, a small deviation results in a relatively large amplitude change DELTAA. The relative amplitude change DELTAA therefore finds good use as a control magnitude.

The configuration example describes a fiber ring laser LAS; the invention can just as well be applied to a fiber laser with a linear fiber resonator. Instead of performing the loss modulation with a Mach-Zehnder-interferometer, a gain-modulated laser can also be used.

Furthermore, the configuration example only depicts the parts and assemblies needed for proper understanding. Other parts and assemblies have not been described in detail, such as e.g. polarization actuators, optical insulators, polarizers or special fibers, whose utilization, arrangement, advantages or even necessity are known to the professional, e.g. from the publication Electronics Letters, Oct. 24, 1991, Vol. 27, no. 22.

What is claimed is:

1. A mode-locked fiber laser (LAS) for generating a pulsed light signal of a predetermined pulse repetition frequency, comprising a fiber resonator (RES), a means (M) for changing the optical path length of the fiber resonator (RES), and a control device (RE) which is connected to the fiber resonator (RES) and to the means (M) for changing the optical path length and in which a control signal for the means (M) for changing the optical path length is generative from a portion of an output signal of the mode-locked fiber laser (LAS), characterized in that in the control device (RE), an interfering signal superimposed on the pulsed light signal is determinable whose frequency is lower than the predetermined pulse repetition frequency, and the control signal is derivable from the interfering signal.

2. A mode-locked fiber laser (LAS) as claimed in claim 1, characterized in that the control device (RE) contains an optical-to-electrical transducer (OE), a detector (DET), an amplifier (AMP), and a controller (PI), that in the detector (DET), the root-mean-square amplitude of the interfering signal is determinable, and that the control signal for the means (M) for changing the optical path length is derivable from the root-mean-square amplitude.

3. A mode-locked fiber laser (LAS) as claimed in claim 2, characterized in that the amplifier (AMP) is a phase-sensitive amplifier, and that the control signal is modulated (fw).

4. A mode-locked fiber laser (LAS) as claimed in claim 1, characterized in that the fiber resonator (RES) is a ring resonator.

5. A mode-locked fiber laser (LAS) as claimed in claim 1, characterized in that the laser is an actively mode-locked fiber laser.

* * * * *